March 17, 1925.

B. PERLMAN

AUTOMOBILE FENDER AND BUMPER

Filed June 24, 1924

1,529,668

INVENTOR
Benjamin Perlman
BY
William S. Gluck
ATTORNEY

Patented Mar. 17, 1925.

UNITED STATES PATENT OFFICE.

BENJAMIN PERLMAN, OF BRONX, NEW YORK.

AUTOMOBILE FENDER AND BUMPER.

Application filed June 24, 1924. Serial No. 722,083.

*To all whom it may concern:*

Be it known that I, BENJAMIN PERLMAN, a citizen of Poland, residing in The Bronx, in the county of Bronx, State of New York, have invented certain new and useful Improvements in Automobile Fenders and Bumpers, of which the following is a specification.

My invention relates to improvements in combined shielding means for automobiles, protecting them from damage by collision and more particularly to afford adequate protection to pedestrians and animals, such as horses, cows, dogs, etc. Such devices are not only applicable and useful in automobiles of the present type used on ordinary streets, and find greater application where automobiles are mounted upon rails and used with corresponding wheels. This type of vehicle has found use upon streets used by pedestrians particularly in suburban sections and my invention finds particular use in devices of this character where collision with pedestrians and animals or other objects cannot be avoided by merely turning from the normal direction of travel.

With vehicles of the class described, wherein numerous exposed parts have been made of rather fragile material, easily subject to damage, my device finds particular utility, for not only are the member points of support of such devices herein contemplated limited, but indiscriminate support usually results in damage both to the device and what may be the most delicate parts of the vehicle by reason of vibration and actual use in any collision or other impact.

Where cover-all bumpers or fenders have been used, the extended parts by reason of the leverage force between points of support and points where force of impact or vibration are applied, usually cause disengagement at points of support or wear and abrasion of fragile parts.

The primary object of my invention is to provide a combined fender and bumper which will yield and prevent injury to objects struck while still protecting the carrier or vehicle and the exposed fragile parts.

Another object of my invention resides in the novel construction of parts of an attachment insuring minimum injury to objects struck by moving vehicles.

Another object of my invention resides in certain improvements in supporting means for devices of the character described, maintaining rigidity of construction in various positions of use while still maintaining simplicity of construction.

A still further object of my invention resides in a cover-all bumper and fender insuring minimum injury to persons likely to be struck at the same time combining rigidity of construction and simplicity of attachment to the vehicle to assure against displacement from the vehicle and damage to the parts thereof.

To attain such objects and such further objects as may hereinafter appear, I will now make reference to the accompanying drawing, illustrating a preferred embodiment of my invention.

In the drawing, Fig. 1 is a side elevation of the improved fender attached in position, parts being broken away for convenience of illustration.

Figure 1:
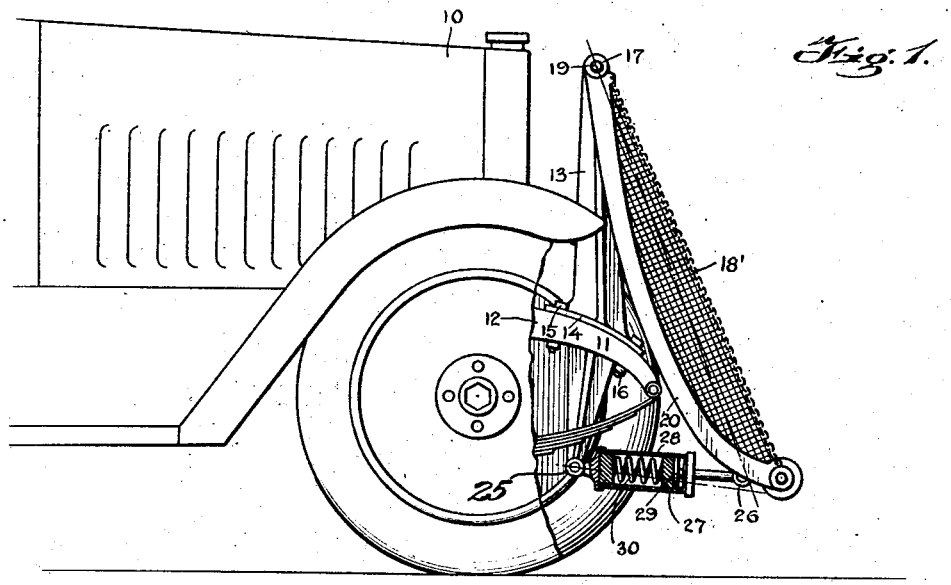
Figure 2:
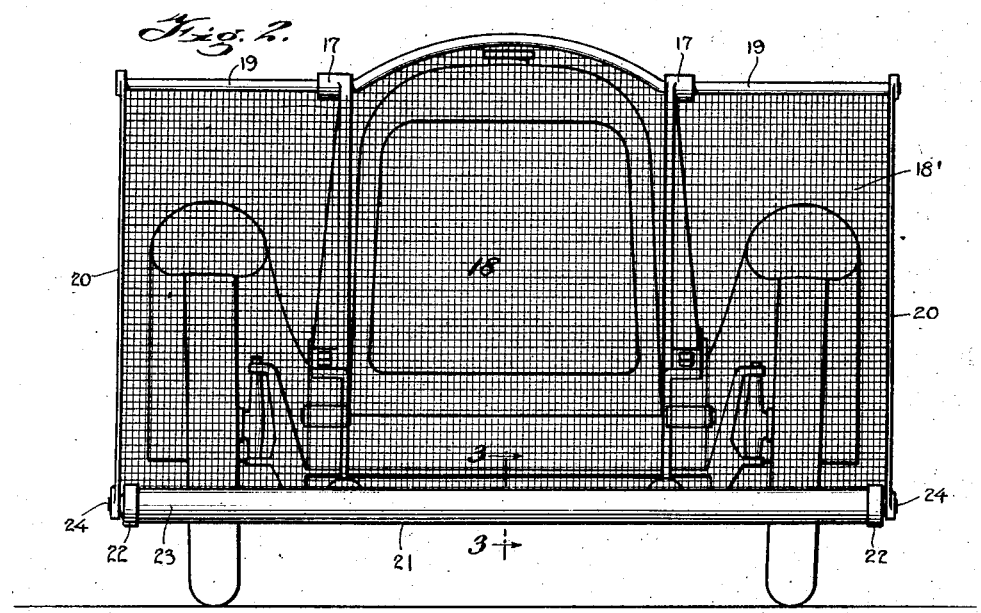
Fig. 2 is a front elevation of my device in position.

In the embodiment illustrated, the device constituting this invention is shown applied to an automobile 10 at the arcuate portions 11 of the main beams 12. A vertical strut 13 has formed thereon integral therewith arcuate flanges or brackets 14 provided with bolt holes for the fastening bolts 15, 16. This arcuate flange is preferably extended and downwardly disposed for a distance sufficient to serve a purpose hereinafter to be described.

Pivoted at the end of the vertical strut 13 at 17 from the bearing members or lugs so provided, there is suspended the resilient frame 18 upon a horizontal support or bar 19 forming the upper side of the frame 18. Side members 20 and lower horizontal portion 21 complete the sides of the frame.

Figure 3:
Fig. 3 is a section taken on the line 3—3 of Fig. 2.

The side members 20 are preferably made curved with the concave portion facing outwardly. The horizontal member 21 is preferably of a curved cross-section having the ferrules 22 which serve to hold the resilient roll 23, or this may otherwise fixedly be mounted along its length. The ferrules 22 are formed with pivots 24 and mounted in the side arms 20 at the lower ends thereof in the lugs there provided. The roll may be made of rubber or other flexible and resilient material in the form of rubber tubing and stuffed with hair or rope, etc. as shown at 24 in the section at Fig. 3.

There is stretched over the frame 19, 20 and 21 a foraminous material 18′ preferably of woven or coiled wire to give added resiliency. The wire fabric assumes a straight line between the members 19 and 20 and is resilient throughout such width as the curved portion of the arm 20 clearing such straight line 18 presents no unprotected metal to any object likely to be struck.

At the lower end of the strut 13 there is provided a lug 25 forming the connection with the lower end of the frame 18 at the pintle 26 interposed by the resilient shock absorbing dash pot 27. This member is formed of a cylindrical member 28 in which moves the plunger 29 resiliently resisting movement by the interposed coiled spring 30.

It will be observed that the members 13, frame and arms 20 and dash pot 27 form the sides of a triangle varying as to form when the dash pot 27 is compressed by impact or pressure of any sort.

The flanges 14 are preferably located at such point along 13 so that if the forces are applied to the frame 18, it will be the center of gravity of the forces on the triangle, considered as a beam. It will thus be seen that there is practically only to be considered the shearing stress of the bolts 15 and 16 without any possible displacement in the direction of the radiator of the machine or without requiring any props or attachment at other point to prevent such displacement.

The arcuate flange 14 is downwardly disposed so that when the triangle is closed by reason of compression as shown in the dotted lines (the axial line of the moving parts) the center of gravity or percussion of the new form of triangle will automatically shift downwardly to maintain the center of forces resisting the impact or compression at the point of support.

The lower portion of the device is preferably made so as to normally clear easily objects of the size of the human being.

It will thus be seen that a structure has been made which not only is rigid preventing any displacement from its normal position tending possible breaking of fragile parts, but an efficient shock-absorbing frame has been provided preventing injury to any object struck by the moving vehicle. The recoil of the device will also effectively serve to throw any object from the path of the vehicle to prevent possible injury from the wheels of the vehicle in the motion remaining before it is brought to a standstill.

While I have described my invention in a preferred form, I am aware that various changes and modifications may be made in the parts employed without departing from the spirit of my invention.

While I have illustrated my invention in connection with the automobile, it will be understood that it is capable of utility in connection with other types of other vehicles in which the invention as defined in the claims is capable of performing its intended functions.

Having thus described my invention and illustrated its use, what I claim as new and desire to secure by Letters Patent is—

1. A fender for automobiles comprising a vertical brace member, a resilient frame support member and a dash pot disposed to form the sides of a triangle, said fender being supported at substantially the center of percussion of said triangle to horizontal forces applied to said resilient frame.

2. A fender for automobiles comprising a vertical brace member, a resilient frame support member and a dash pot disposed to form the sides of a triangle respectively, said dash pot being resiliently contractile, said fender being supported at substantially the center of percussion, said support being arcuately arranged, automatically shifting the center of percussion as the triangular relation varies with the contraction of the dash pot member.

3. A fender or bumper for automobile vehicles, comprising a vertical brace member, a resilient frame support member and a dash pot disposed to form the sides of a triangle, said vertical member having thereon mounted a downwardly disposed arcuate support and positioned to keep such portions above and below such arcuate support in substantial balance to side thrusts on the frame member.

In witness whereof, I have signed this specification, this 21st day of June, 1924.

BENJAMIN PERLMAN.